(12) United States Patent
Ayuzawa et al.

(10) Patent No.: US 9,981,699 B2
(45) Date of Patent: May 29, 2018

(54) BODY STRUCTURE OF AUTOMOBILE AND METHOD FOR MANUFACTURING BODY FLOOR

(71) Applicant: HONDA MOTOR CO., LTD., Minato-ku, Tokyo (JP)

(72) Inventors: Shotaro Ayuzawa, Wako (JP); Yuta Urushiyama, Wako (JP); Takahira Kawata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 15/120,219

(22) PCT Filed: Nov. 21, 2014

(86) PCT No.: PCT/JP2014/080875
§ 371 (c)(1),
(2) Date: Aug. 19, 2016

(87) PCT Pub. No.: WO2015/129110
PCT Pub. Date: Sep. 3, 2015

(65) Prior Publication Data
US 2017/0073020 A1 Mar. 16, 2017

(30) Foreign Application Priority Data

Feb. 25, 2014 (JP) .................................. 2014-034341
Jul. 29, 2014 (JP) .................................. 2014-154069

(51) Int. Cl.
*B62D 25/20* (2006.01)
*B62D 21/15* (2006.01)
(Continued)

(52) U.S. Cl.
CPC ............ *B62D 25/2036* (2013.01); *B32B 3/28* (2013.01); *B32B 5/12* (2013.01); *B62D 21/157* (2013.01);
(Continued)

(58) Field of Classification Search
CPC .... B62D 25/2036; B62D 21/152; B32B 5/12; B32B 3/28
(Continued)

(56) References Cited

U.S. PATENT DOCUMENTS 4,875,766 A * 10/1989 Shimodaira .............. G02B 5/08
359/883
5,619,784 A 4/1997 Nishimoto et al.
(Continued)

FOREIGN PATENT DOCUMENTS

JP H04-19379 U 2/1992
JP H04-334681 A 11/1992
(Continued)

*Primary Examiner* — Pinel E Romain
(74) *Attorney, Agent, or Firm* — Carrier Blackman & Associates, P.C.; Joseph P. Carrier; William D. Blackman (57) ABSTRACT

In a body structure of an automobile, a floor panel having a sandwich structure in which a core is sandwiched between and joined to an outer skin and an inner skin, which are made of a CFRP, and a first load-dispersing frame extending in the fore-and-aft direction along a side sill is disposed between an energy-absorbing member and the core. A locally concentrated load inputted into the side sill is absorbed by crumpling of the energy-absorbing member of the interior of the floor panel beneath the side sill and then widely dispersed through the floor panel further inside in the vehicle width direction than the side sill by the first load-dispersing frame, and local destruction of the floor panel further inside in the vehicle width direction than the side sill is inhibited. Furthermore, by increasing bending stiffness of the first load-dispersing frame, to reduce the sheet thickness of the CFRP outer and the inner skins, a light weight is achieved.

11 Claims, 10 Drawing Sheets

(51) Int. Cl.
*B62D 29/04* (2006.01)
*B32B 3/28* (2006.01)
*B32B 5/12* (2006.01)

(52) U.S. Cl.
CPC ........ *B62D 29/043* (2013.01); *B32B 2605/00* (2013.01); *B60Y 2306/01* (2013.01); *B60Y 2410/124* (2013.01)

(58) Field of Classification Search
USPC ............................ 296/187.08, 187.1, 187.12
See application file for complete search history.

(56) References Cited

U.S. PATENT DOCUMENTS

| | | | |
|---|---|---|---|
| 2015/0061320 A1* | 3/2015 | Yabu | B60R 19/18 296/187.1 |
| 2015/0158532 A1 | 6/2015 | Ayuzawa et al. | |
| 2016/0152274 A1* | 6/2016 | Kang | B62D 21/157 296/187.12 |

FOREIGN PATENT DOCUMENTS

| | | |
|---|---|---|
| JP | 2009-190696 A | 8/2009 |
| JP | 2010-125870 A | 6/2010 |
| JP | 2013-126811 A | 6/2013 |
| JP | 2013-136275 A | 7/2013 |
| JP | 2013-216201 A | 10/2013 |
| JP | 2013-256265 A | 12/2013 |
| WO | 2013/183359 A1 | 12/2013 |

\* cited by examiner

BODY STRUCTURE OF AUTOMOBILE AND METHOD FOR MANUFACTURING BODY FLOOR

TECHNICAL FIELD

The present invention relates to a body structure of an automobile in which an energy-absorbing member that crumples in a vehicle width direction so as to absorb a collision load is disposed in an interior of a floor panel to which a lower face of a side sill having a closed cross-section is connected and, furthermore, the present invention relates to a method for manufacturing a body floor equipped with the floor panel and the side sill.

BACKGROUND ART

An arrangement in which, when manufacturing a body floor made of a CFRP having a floor panel and side sill formed as a unit, an opening is formed in a lower end part of an inner wall in the vehicle width direction of the side sill, and an outer end part in the vehicle width direction of the floor panel is inserted into the interior of the side sill via the opening, thus carrying out joining, is known from Patent Document 1 below.

RELATED ART DOCUMENTS

Patent Documents

Patent Document 1: Japanese Patent Application Laid-open No. 2010-125870

SUMMARY OF THE INVENTION

Problems to be Solved by the Invention

In the conventional arrangement above, since the collision load of a side collision is directly inputted into the side sill, the side sill collapses inward in the vehicle width direction with its lower end part connected to the floor panel as a fulcrum, and the side sill cannot be crumpled effectively by means of the collision load; not only is there a possibility that the energy-absorbing performance will deteriorate, but there is also the problem that the productivity decreases since it is necessary to insert the floor panel into the interior of the side sill in a step of manufacturing the side sill.

The present invention has been accomplished in light of the above circumstances, and it is an object thereof to prioritize the energy-absorbing performance of a floor panel over that of a side sill as well as to improve the productivity of a body floor equipped with the floor panel and the side sill.

Means for Solving the Problems

In order to attain the above object, according to a first aspect of the present invention, there is provided a body structure of an automobile, in which an energy-absorbing member that crumples in a vehicle width direction so as to absorb a collision load is disposed in an interior of a floor panel to which a lower face of a side sill having a closed cross-section is connected, the floor panel having a sandwich structure in which a core is sandwiched between and joined to an outer skin and an inner skin, which are made of a CFRP, wherein a first load-dispersing frame extending in a fore-and-aft direction along the side sill is disposed between the energy-absorbing member and the core.

Further, according to a second aspect of the present invention, in addition to the first aspect, the outer skin and the inner skin are formed by layering carbon continuous fiber layers in which carbon continuous fibers are oriented in directions of at least 0°, +60°, and −60° when the fore-and-aft direction is defined as 0°.

Furthermore, according to a third aspect of the present invention, in addition to the first or second aspect, the floor panel and the side sill are formed from separate members, a lower face of the side sill is adhered to an upper face of the floor panel, and an outer end part in the vehicle width direction of the floor panel and an outer end part in the vehicle width direction of the side sill are linked.

Moreover, according to a fourth aspect of the present invention, in addition to any one of the first to third aspects, a thickness in a vertical direction of the energy-absorbing member is larger than a thickness in the vertical direction of the core with a step portion of the outer skin as a boundary, and the first load-dispersing frame between the energy-absorbing member and the core has a fitting part that fits onto the step portion.

Further, according to a fifth aspect of the present invention, in addition to any one of the first to fourth aspects, an outer end part in the vehicle width direction of the energy-absorbing member projects further outside in the vehicle width direction than an outer end part in the vehicle width direction of the side sill.

Furthermore, according to a sixth aspect of the present invention, in addition to any one of the first to fifth aspects, a second load-dispersing frame extending in the fore-and-aft direction is disposed on the outside in the vehicle width direction of the energy-absorbing member.

Moreover, according to a seventh aspect of the present invention, in addition to any one of the first to sixth aspects, the core is formed from a corrugated sheet made of a CFRP, and an axis of the corrugated sheet runs along the vehicle width direction.

Further, according to an eighth aspect of the present invention, in addition to any one of the first to seventh aspects, the energy-absorbing member is formed from a corrugated sheet in which carbon continuous fiber layers are layered.

Furthermore, according to a ninth aspect of the present invention, in addition to any one of the first to eighth aspects, a space is formed between an outer end part in the vehicle width direction of the floor panel and an outer end part in the vehicle width direction of the energy-absorbing member.

Moreover, according to a tenth aspect of the present invention, in addition to any one of the first to ninth aspects, the energy-absorbing member is formed from a sheet material forming a large number of hollow parts extending in the vehicle width direction, and an inner end part in the vehicle width direction of the sheet material is fitted into a fitting groove formed in an outer face in the vehicle width direction of a support wall fixed to the interior of the floor panel.

Further, according to an eleventh aspect of the present invention, in addition to any one of the first to tenth aspects, the side sill has an L-shaped cross section in which a height of an outer portion in the vehicle width direction is smaller than a height of an inner portion in the vehicle width direction.

Furthermore, according to a twelfth aspect of the present invention, there is provided a method for manufacturing a body floor, comprising a step of manufacturing a floor panel in which an energy-absorbing member that crumples in a vehicle width direction so as to absorb a collision load is further sandwiched between outer end parts in the vehicle width direction of a sandwich structure formed by sandwiching a core between an outer skin and an inner skin made of a CFRP and joining, a step of manufacturing a side sill with a closed cross-section having substantially an entire periphery of a partition wall plate joined to an inner face of the side sill, a step of joining the side sill to an upper face of the floor panel so that an outer end part in the vehicle width direction of the energy-absorbing member projects further outside in the vehicle width direction than an outer end part in the vehicle width direction of the side sill, and a step of linking an outer end part in the vehicle width direction of the floor panel and the outer end part in the vehicle width direction of the side sill by a linking member.

A front floor panel 12 of an embodiment corresponds to the floor panel of the present invention.

Effects of the Invention

In accordance with the first aspect of the present invention, the energy-absorbing member, which crumples in the vehicle width direction so as to absorb a collision load, is disposed in the interior of the floor panel to which the lower face of the side sill having a closed cross-section is connected. Since the floor panel having a sandwich structure in which the core is sandwiched between and joined to the outer skin and the inner skin, which are made of a CFRP, and the first load-dispersing frame extending in the fore-and-aft direction along the side sill is disposed between the energy-absorbing member and the core, a locally concentrated load inputted into the side sill due to a pole collision, etc. is absorbed by crumpling of the energy-absorbing member of the interior of the floor panel beneath the side sill and then widely dispersed through the floor panel further inside in the vehicle width direction than the side sill by the first load-dispersing frame, and local destruction of the floor panel further inside in the vehicle width direction than the side sill is inhibited. Furthermore, it is possible, by increasing the bending stiffness of the first load-dispersing frame, to reduce the sheet thickness of the outer skin and the inner skin, which are made of a CFRP, and achieve a light weight.

Furthermore, in accordance with the second aspect of the present invention, since the outer skin and the inner skin are formed by layering carbon continuous fiber layers in which carbon continuous fibers are oriented in directions of at least 0°, +60°, and −60° when the fore-and-aft direction is defined as 0°, it is possible, by imparting quasi-isotropy to the outer skin and the inner skin and making the carbon continuous fiber at 0° resistant to a locally concentrated shear load due to a pole collision, etc. and the carbon continuous fibers at +60° and −60° resistant to a tensile load and a compressive load, to minimize the deformation of the floor panel further inside in the vehicle width direction than the side sill.

Moreover, in accordance with the third aspect of the present invention, since the floor panel and the side sill are formed from separate members, it becomes possible to separately manufacture the floor panel and the side sill and then assemble them, and it becomes unnecessary to impart a complicated shape to a CFO, thus improving the productivity. Moreover, since the lower face of the side sill is adhered to the upper face of the floor panel, and the outer end part in the vehicle width direction of the floor panel and the outer end part in the vehicle width direction of the side sill are linked, when the collision load of a side collision is inputted into the side sill, it is possible to further reliably suppress collapse of the side sill inward in the vehicle width direction.

Furthermore, in accordance with the fourth aspect of the present invention, since the thickness in the vertical direction of the energy-absorbing member is larger than the thickness in the vertical direction of the core with the step portion of the outer skin as a boundary, and the first load-dispersing frame between the energy-absorbing member and the core has a fitting part that fits onto the step portion, when the collision load of a side collision is transmitted from the energy-absorbing member to the outer skin and the inner skin, which are made of a CFRP, via the first load-dispersing frame, it is possible to enhance the energy-absorbing effect by efficiently transmitting part of the collision load to the outer skin and the inner skin via the fitting part fitted onto the step portion and dispersing it.

Moreover, in accordance with the fifth aspect of the present invention, since the outer end part in the vehicle width direction of the energy-absorbing member projects further outside in the vehicle width direction than an outer end part in the vehicle width direction of the side sill, the collision load of a side collision is inputted into the energy-absorbing member prior to it being inputted into the side sill, the energy-absorbing member crumples and absorbs the energy to thus reduce the collision load inputted into the side sill, and the side sill crumples without collapsing inward in the vehicle width direction, thus contributing to the absorption of energy.

Furthermore, in accordance with the sixth aspect of the present invention, since the second load-dispersing frame extending in the fore-and-aft direction is disposed on the outside in the vehicle width direction of the energy-absorbing member, it is possible, by dispersing the collision load of a side collision inputted into the floor panel by means of the second load-dispersing frame to thus transmit it to the energy-absorbing member, to make the energy-absorbing member crumple over a wide range, thereby enhancing the energy-absorbing effect.

Moreover, in accordance with the seventh aspect of the present invention, since the core is formed from a corrugated sheet made of a CFRP, and the axis of the corrugated sheet runs along the vehicle width direction, the core does not easily buckle when the collision load of a side collision is inputted, and the collision load is transmitted and dispersed effectively, thereby enhancing the energy-absorbing effect. If the axis of the corrugated sheet ran along the fore-and-aft direction, the core would easily buckle due to the collision load of a side collision, the collision load would not be able to be transmitted and dispersed effectively, and the energy-absorbing effect would be degraded.

Furthermore, in accordance with the eighth aspect of the present invention, since the energy-absorbing member is formed from a corrugated sheet in which carbon continuous fiber layers are layered, the carbon continuous fiber crossing the ridge line of the energy-absorbing member breaks, and the energy-absorbing member tears from the center with respect to the sheet thickness in the manner of the skin of a banana peeling off, thus enabling an energy-absorbing effect to be exhibited.

Moreover, in accordance with the ninth aspect of the present invention, since a space is formed between the outer end part in the vehicle width direction of the floor panel and the outer end part in the vehicle width direction of the energy-absorbing member, when the collision load of a side collision is inputted into the floor panel, the energy-absorbing member can crumple stably in the vehicle width direction without being restrained by the floor panel, thereby improving the energy-absorbing effect of the energy-absorbing member.

Furthermore, in accordance with the tenth aspect of the present invention, since the energy-absorbing member is formed from a sheet material forming a large number of hollow parts extending in the vehicle width direction, and the inner end part in the vehicle width direction of the sheet material is fitted into the fitting groove formed in the outer face in the vehicle width direction of the support wall fixed to the interior of the floor panel, when the collision load of a side collision is inputted into the floor panel, the support wall prevents the energy-absorbing member from collapsing, thus promoting crumpling of the energy-absorbing member and the support wall and thereby enabling the energy-absorbing effect to be enhanced.

Moreover, in accordance with the eleventh aspect of the present invention, since the side sill has an L-shaped cross section in which the height of the outer portion in the vehicle width direction is smaller than that of an inner portion in the vehicle width direction, the height of a portion that crumples first when the collision load of a side collision is inputted into the side sill becomes small and the portion becomes easy to crumple; not only does the initial load decrease, but the moment arm of the load that makes the side sill collapse inward in the vehicle width direction also becomes small, thus enabling the side sill to be more effectively prevented from collapsing.

Furthermore, in accordance with the twelfth aspect of the present invention, since the floor panel in which the energy-absorbing member, which crumples in the vehicle width direction so as to absorb a collision load, is further sandwiched between the outer end parts in the vehicle width direction of a sandwich structure formed by sandwiching the core between the outer skin and the inner skin, made of a CFRP, and joining is first manufactured, the side sill with a closed cross-section having substantially the entire periphery of the partition wall plate joined to the inner face of the side sill is then manufactured, the side sill is then joined to the upper face of the floor panel so that the outer end part in the vehicle width direction of the energy-absorbing member projects further outside in the vehicle width direction than the outer end part in the vehicle width direction of the side sill, and the outer end part in the vehicle width direction of the floor panel and the outer end part in the vehicle width direction of the side sill are linked by means of a linking member, the collision load of a side collision is first inputted into the floor panel prior to it being inputted into the side sill, the energy-absorbing member crumples to thus absorb the energy, thus reducing the collision load inputted into the side sill, and the side sill crumples without collapsing inward in the vehicle width direction, thereby contributing to the absorption of energy. Moreover, since the floor panel and the side sill can be assembled after they are separately manufactured, the productivity of the body floor improves.

EXPLANATION OF REFERENCE NUMERALS AND SYMBOLS

12 Front floor panel (floor panel)
16 Side sill
18 Outer skin
18b Step portion
19 Inner skin
22 Partition wall plate
23 Energy-absorbing member
24 Support wall
24a Fitting groove
25 First load-dispersing frame
26 Core
27 Linking member
29 Second load-dispersing frame
α Space

MODES FOR CARRYING OUT THE INVENTION

Embodiments of the present invention are explained below by reference to the attached drawings. In the present specification, the fore-and-aft direction, the left-and-right direction (the vehicle width direction), and the vertical direction are defined with reference to an occupant seated on a driving seat.

First Embodiment

A first embodiment of the present invention is now explained by reference to FIG. 1 to FIG. 8.

Figure 1:
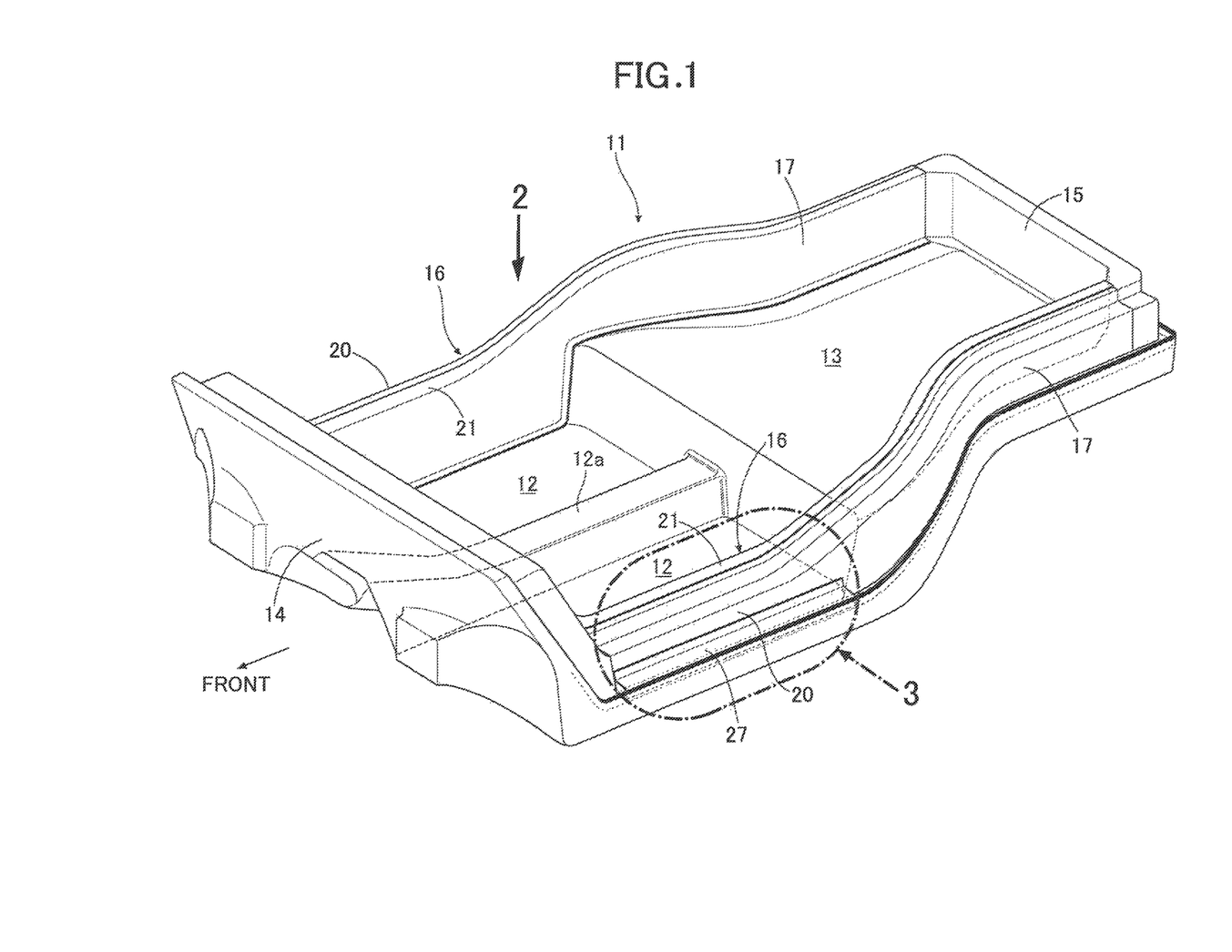
FIG. 1 is a perspective view of a body floor made of a CFRP. (first embodiment)
Figure 2:
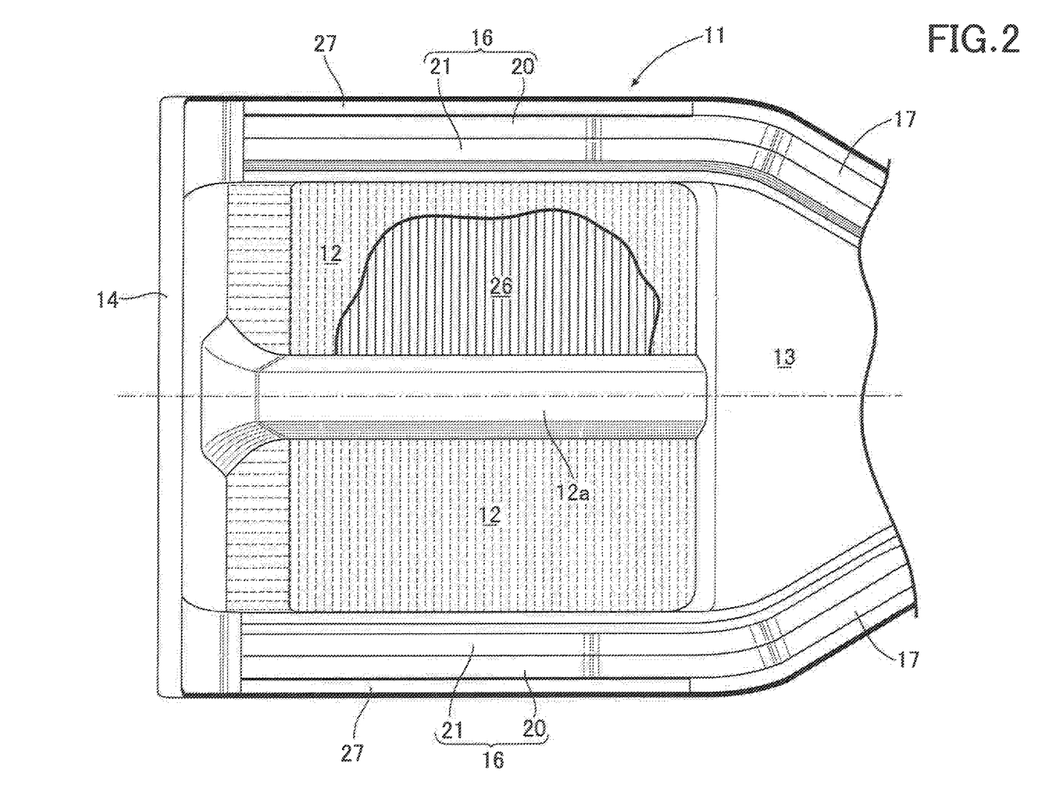
FIG. 2 is a view in the direction of arrow 2 in FIG. 1. (first embodiment)

As shown in FIG. 1 and FIG. 2, a body floor 11 of an automobile formed into a bathtub shape using a CFRP (carbon fiber-reinforced plastic) includes a front floor panel 12, a rear floor panel 13 formed so as to be stepped higher with respect to the front floor panel 12, a dash panel lower 14 rising from the front end of the front floor panel 12, a rear end cross member 15 rising from the rear end of the rear floor panel 13, a pair of left and right side sills 16 and 16 extending rearward from a rear face of the dash panel lower 14 along opposite end parts in the vehicle width direction of the front floor panel 12, and a pair of left and right rear side frames 17 and 17 extending rearward from rear ends of the side sills 16 and 16 along opposite end parts in the vehicle width direction of the rear floor panel 13 and being connected to opposite end parts in the vehicle width direction of the rear end cross member 15. Formed in a middle part in the vehicle width direction of the front floor panel 12 is a floor tunnel 12a extending in the fore-and-aft direction.

In the present embodiment, the front floor panel 12, the rear floor panel 13, the dash panel lower 14, and the rear end cross member 15 are formed as a unit, and the side sills 16 and 16 and the rear side frames 17 and 17, which are formed as a unit, are joined to the above.

Figure 3:
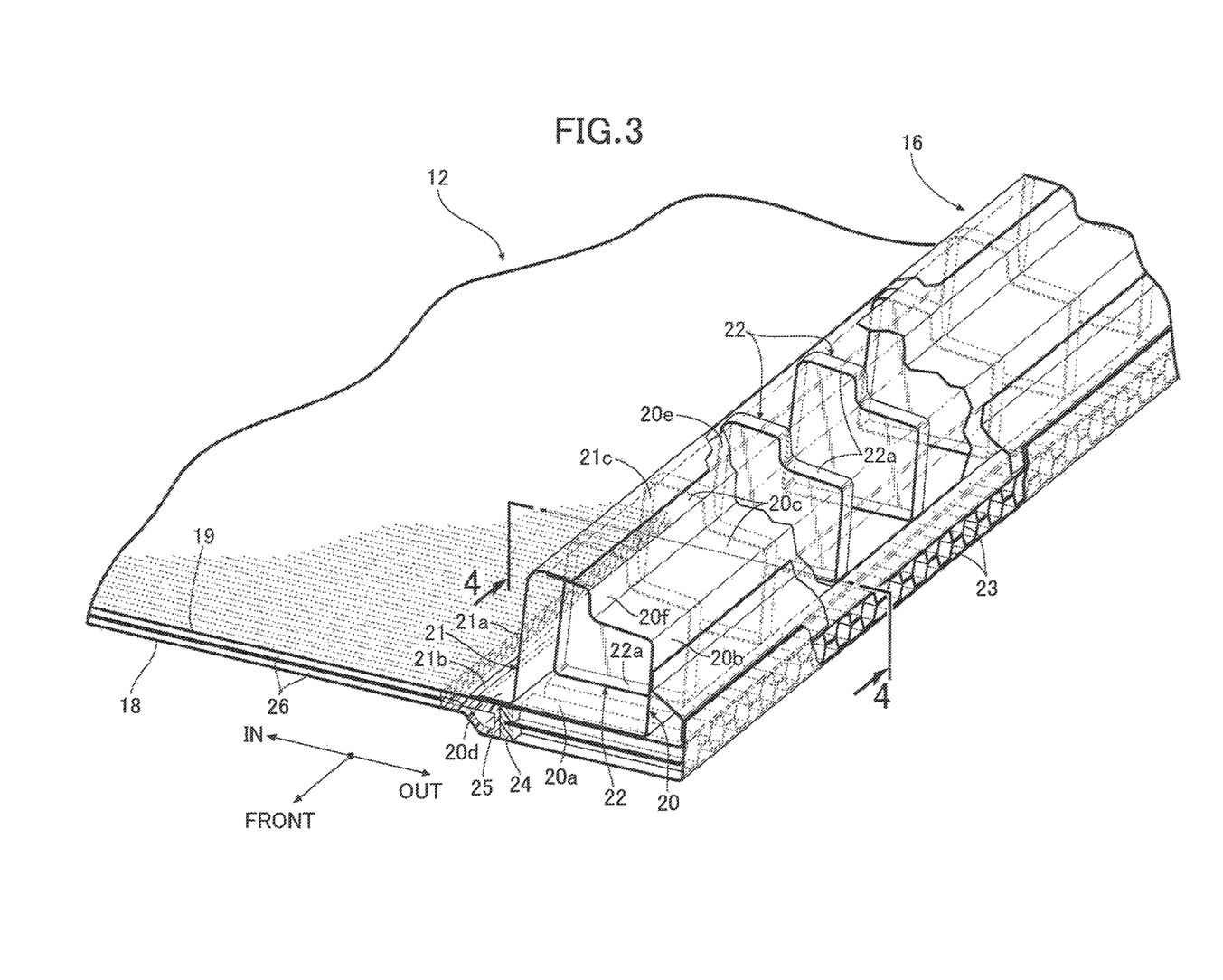
FIG. 3 is an enlarged view of arrowed part 3 in FIG. 1. (first embodiment)
Figure 4:
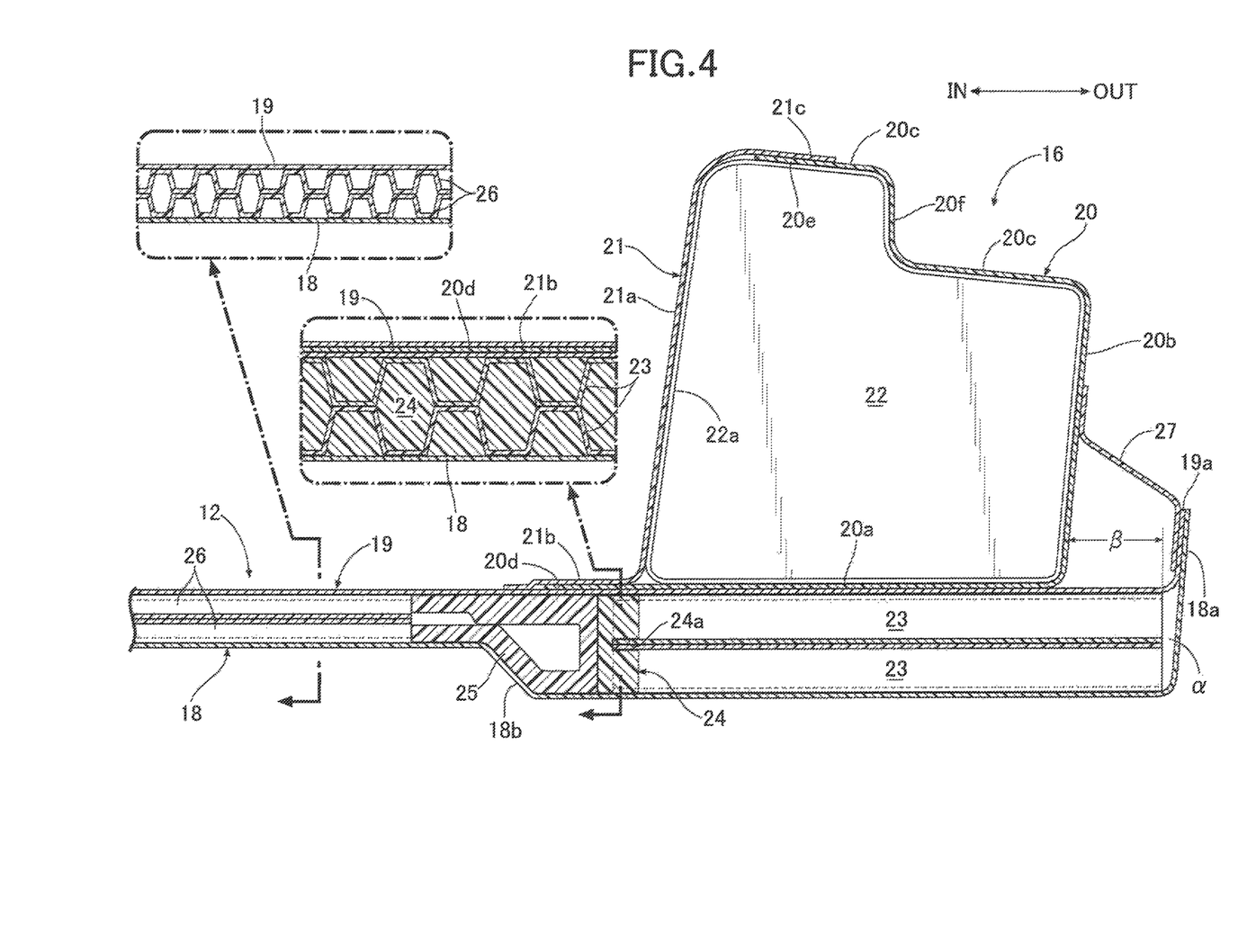
FIG. 4 is a sectional view along line 4-4 in FIG. 3. (first embodiment)
Figure 5:
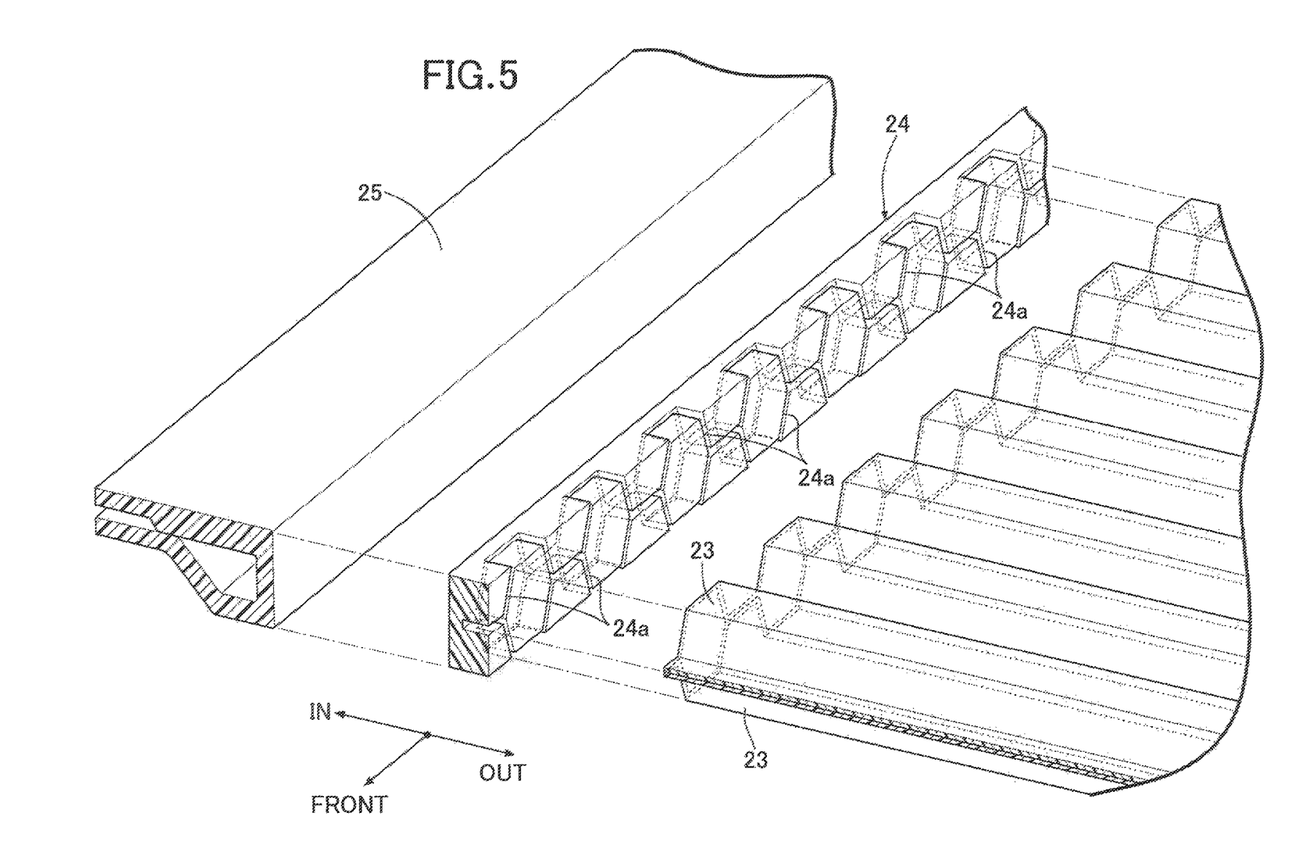
FIG. 5 is an exploded perspective view of an essential part of FIG. 4. (first embodiment)

As shown in FIG. 3 to FIG. 5, the front floor panel 12 is formed by joining by adhesion an outer skin 18 on the outer side (lower side) of a vehicle body and an inner skin 19 on the inner side (upper side) of the vehicle body via joining flanges 18a and 19a formed by bending upward outer end parts in the vehicle width direction thereof.

The side sill 16 is formed from an outer member 20 having a lower wall 20a, a vehicle width direction outer wall 20b, an upper wall 20c, a joining flange 20d formed by extending the lower wall 20a inward in the vehicle width direction, and a joining flange 20e formed by extending the upper wall 20c inward in the vehicle width direction, and an inner member 21 having a vehicle width direction inner wall 21a, a joining flange 21b formed by bending the lower end of the vehicle width direction inner wall 21a inward in the vehicle width direction, and a joining flange 21c formed by bending the upper end of the vehicle width direction inner wall 21a outward in the vehicle width direction, a closed cross-section being formed by superimposing the joining flanges 20d and 20e of the outer member 20 on the joining flanges 21b and 21c of the inner member 21 and joining them by adhesion. A step portion 20f is formed on the upper wall 20c of the outer member 20 of the side sill 16, the height of the side sill 16 being low on the outside in the vehicle width direction of the step portion 20f.

A plurality of partition wall plates 22 are disposed in the interior of the side sill 16 at predetermined intervals in the fore-and-aft direction. The partition wall plate 22, which has a plate shape, has a joining flange 22a formed by bending an outer peripheral part through right angles, and substantially the entire periphery of the joining flange 22a is joined to an inner face of the side sill 16 by adhesion.

An outer end part in the vehicle width direction of the front floor panel 12 is thicker in the vertical direction compared with a middle part in the vehicle width direction, and a pair of upper and lower energy-absorbing members 23 and 23 are disposed in the thickened part. The energy-absorbing members 23 and 23 are corrugated sheet-shaped members formed from a CFRP material in which a plurality of carbon continuous fiber layers are layered, and a large number of tubular closed cross-section parts extending in the vehicle width direction are formed by joining the energy-absorbing members 23 and 23 in the vertical direction.

Fixed by adhesion to inner sides in the vehicle width direction of the energy-absorbing members 23 and 23 between the outer skin 18 and the inner skin 19 is a support wall 24, made of an SMC (Sheet Molding Compound). The energy-absorbing members 23 and 23 are fitted into a fitting groove 24a formed in an outer face in the vehicle width direction of the support wall 24 and joined by adhesion. Upper faces of the energy-absorbing members 23 and 23 are joined by adhesion to a lower face of the inner skin 19, and lower faces of the energy-absorbing members 23 and 23 are joined by adhesion to an upper face of the outer skin 18. In this arrangement, a space α (see FIG. 4) is formed between the outer end part in the vehicle width direction of the energy-absorbing members 23 and 23 and the outer end part in the vehicle width direction of the front floor panel 12.

Disposed in a portion that is on the inner side in the vehicle width direction of the support wall 24 and in which the thickness of the front floor panel 12 changes is a first load-dispersing frame 25, made of a CFRP (or aluminum), extending in the fore-and-aft direction. The first load-dispersing frame 25 is formed so as to have a hollow cross section by curing a CFRP prepreg wrapped around a mandrel and then withdrawing the mandrel. An upper face and a lower face of the first load-dispersing frame 25 are joined by adhesion to the lower face of the inner skin 19 and the upper face of the outer skin 18 respectively, and an outer face in the vehicle width direction thereof is joined by adhesion to an inner face in the vehicle width direction of the support wall 24.

Disposed in the interior of the front floor panel 12 on the inside in the vehicle width direction of the first load-dispersing frame 25 are two sheets of corrugated sheet-shaped cores 26 and 26, joined to each other by adhesion, in a superimposed state, an upper face and a lower face thereof being joined by adhesion or welding to the lower face of the inner skin 19 or the upper face of the outer skin 18 thus forming a sandwich structure. In this arrangement, the first load-dispersing frame 25 is a member having a stepped fitting part that is thick in an outer end part in the vehicle width direction facing the energy-absorbing members 23 and 23, which are thick in the vertical direction, and that is thin in an inner end part in the vehicle width direction facing the cores 26 and 26, which are thin in the vertical direction. A step portion 18b is formed on the outer skin 18, which is adhered or welded to a stepped part of the lower face of the first load-dispersing frame 25, the fitting part of the first load-dispersing frame 25 engaging with the step portion 18b (see FIG. 4).

The side sill 16 is placed on and joined by adhesion to an upper face of the inner skin 19 in an outer end part in the vehicle width direction of the front floor panel 12, that is, in upper parts of the energy-absorbing members 23 and 23. In this arrangement, the vehicle width direction outer wall 20b of the side sill 16 is offset on the inner side in the vehicle width direction with respect to the outer end parts in the vehicle width direction of the energy-absorbing members 23 and 23 only by a distance β (see FIG. 4). In other words, the outer end parts in the vehicle width direction of the energy-absorbing members 23 and 23 project outward in the vehicle width direction only by the distance β from the vehicle width direction outer wall 20b of the side sill 16. Upper and lower end parts of a linking member 27 having a crank-shaped cross section made of a CFRP sheet material are joined by adhesion to the vehicle width direction outer wall 20b of the side sill 16 and joining flanges 18a and 19a of the front floor panel 12, which are superimposed as two layers.

Figure 7:
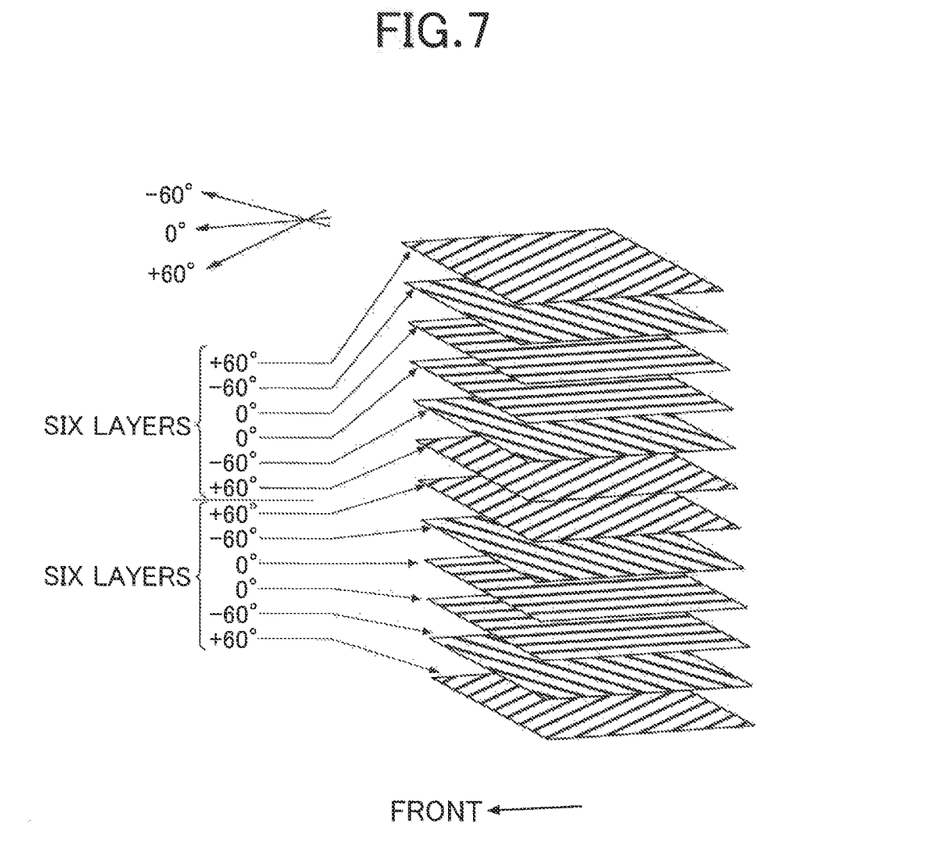
FIG. 7 is a view showing a layer structure of an outer skin and an inner skin. (first embodiment)

As shown in FIG. 7, the outer skin 18 and the inner skin 19 are each formed from a CFRP material in which 12 carbon continuous fiber layers are layered. Each carbon continuous fiber layer contains a large number of carbon continuous fibers aligned in one direction; there are four layers having an alignment direction of 0° when the alignment direction of the carbon continuous fiber is defined as 0° for the fore-and-aft direction, four layers having an alignment direction of +60°, and four layers having an alignment direction of −60°. This imparts quasi-isotropy to the strength of the outer skin 18 and the inner skin 19, thus evenly supporting a shear load, a tensile load, and a compressive load from each direction inputted into the outer skin 18 and the inner skin 19 and thereby minimizing deformation of the front floor panels 12 and 12.

The operation of the first embodiment of the present invention having the above arrangement is now explained.

When the side sill 16 is involved in a side collision with a pole or a tree and a local collision load is inputted thereinto, the side sill 16 collapses inward in the vehicle width direction with the lower end part connected to the upper face of the front floor panel 12 as a fulcrum, and there is a possibility that an energy-absorbing effect due to crumpling of the side sill 16 will not be able to be exhibited sufficiently.

However, in accordance with the present embodiment, since the outer end parts in the vehicle width direction of the energy-absorbing members 23 and 23 project outward in the vehicle width direction only by the distance β compared with the vehicle width direction outer wall 20*b* of the side sill 16 (see FIG. 4), the collision load of a side collision is first inputted into the outer end part in the vehicle width direction of the front floor panel 12, and the energy-absorbing members 23 and 23 disposed in the interior thereof crumple, thus absorbing part of the collision load. As a result, the collision load inputted into the side sill 16 is weakened and, moreover, since the vehicle width direction outer wall 20*b* of the side sill 16 and the outer end part in the vehicle width direction of the front floor panel 12 are linked via the linking member 27, the side sill 16 is prevented from collapsing inward in the vehicle width direction, the side sill 16 is crumpled effectively by the collision load, and an energy-absorbing effect can be exhibited effectively.

Figure 8:
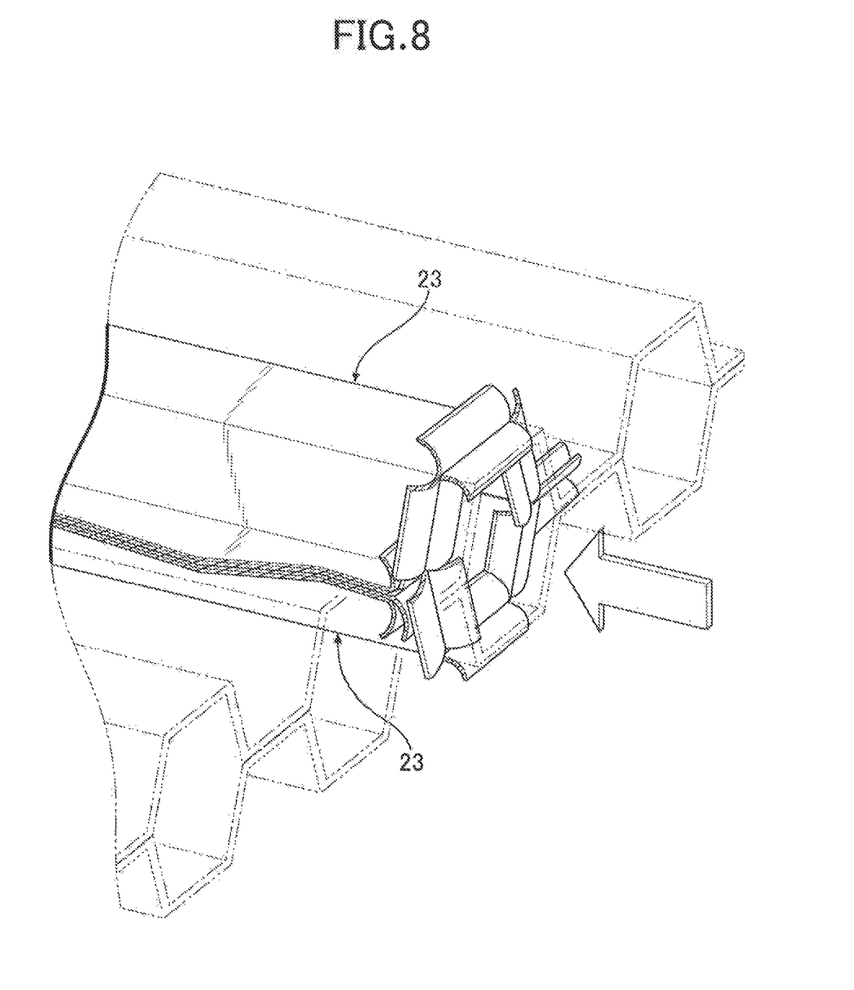
FIG. 8 is a view showing an energy-absorbing member in a destroyed state. (first embodiment)

Since the corrugated sheet-shaped energy-absorbing members 23 and 23 are formed from a CFRP material in which a plurality of carbon continuous fiber layers are layered, as shown in FIG. 8, when buckling due to the collision load, continuous fibers aligned in a direction orthogonal to the ridge line break at the ridge line, and each layer is separated outward from the center in the sheet thickness in the manner of the skin of a banana peeling off, thus exhibiting an energy-absorbing effect. The alignment direction of carbon continuous fibers of the energy-absorbing member 23 is similar to that of the outer skin 18 and the inner skin 19 shown in FIG. 7, and when the vehicle width direction is defined as 0°, an inner layer in the center of the sheet thickness is 0° and outer layers on opposite sides thereof are for example +60° and −60°.

Furthermore, with regard to the side sill 16, since the step portion 20*f* is formed on the upper wall 20*c* of the outer member 20 (see FIG. 4), it has an L-shaped cross section in which the height of the outer portion in the vehicle width direction is lower than that of the inner portion in the vehicle width direction, and the height of a portion that crumples first when the collision load of a side collision is inputted into the side sill 16 is low; not only is the portion easy to crumple and the initial load reduced, but the load that makes the side sill 16 collapse inward in the vehicle width direction also becomes small, thereby preventing more effectively the side sill 16 from collapsing. Moreover, since substantially the entire periphery of the plurality of partition wall plates 22 is joined to the inner face of the side sill 16, the stiffness can be enhanced by reinforcing the side sill 16 with the partition wall plates 22, and it is possible to suppress bending deformation of the side sill 16 toward the compartment side due to the collision load of a side collision.

Furthermore, since the space α is formed between the outer end part in the vehicle width direction of the front floor panel 12 and the outer end part in the vehicle width direction of the energy-absorbing members 23 and 23 (see FIG. 4), when the collision load of a side collision is inputted into the front floor panel 12, the energy-absorbing members 23 and 23 are not restrained by the front floor panel 12 but can crumple stably in the vehicle width direction, thus enhancing the energy-absorbing effect of the energy-absorbing members 23 and 23.

Moreover, since the energy-absorbing members 23 and 23 are formed from a sheet material forming a large number of hollow parts extending in the vehicle width direction, and the inner end part in the vehicle width direction of the sheet material is fitted into the fitting groove 24*a* formed in the outer face in the vehicle width direction of the support wall 24 fixed to the interior of the front floor panel 12, the support wall 24 prevents the energy-absorbing members 23 and 23 from collapsing when the collision load of a side collision is inputted into the front floor panel 12, thereby promoting crumpling of the energy-absorbing members 23 and 23 and the support wall 24 and enabling the energy-absorbing effect to be enhanced.

Furthermore, since a high strength sandwich structure is formed by disposing, between the outer skin 18 and the inner skin 19 of the front floor panel 12, the first load-dispersing frame 25, which is long and has high bending stiffness, extending in the fore-and-aft direction along the vehicle width direction inner wall 21*a* of the side sill 16 and being continuous with the inner side in the vehicle width direction of the support wall 24, and the cores 26 and 26, which are continuous with the inner side in the vehicle width direction of the first load-dispersing frame 25, the collision load of a side collision inputted into the front floor panel 12 is absorbed by crumpling of the energy-absorbing member 23 and then dispersed through the outer skin 18 and the inner skin 19, which are made of a CFRP, by means of the first load-dispersing frame 25.

In particular, when involved in a side collision with a narrow, long object such as a pole, it is possible to prevent the front floor panel 12 having a sandwich structure from being destroyed by a locally concentrated load after the energy-absorbing member 23 is destroyed. In accordance with the present embodiment, since the first load-dispersing frame 25 has a polygonal cross section and has a high bending stiffness, a locally concentrated collision load from an object such as a pole is dispersed over a wide range of the front floor panel 12 having a sandwich structure in which the core 26 is sandwiched between the outer skin 18 and the inner skin 19, made of a CFRP, destruction due to the collision load is received by the energy-absorbing member 23 beneath the side sill 16, and it is thus possible to prevent the front floor panel 12 having a sandwich structure further inside in the vehicle width direction than the side sill 16 from being destroyed. Furthermore, it is possible, by further enhancing the bending stiffness of the first load-dispersing frame 25, to reduce the sheet thickness of the outer skin 18 and the inner skin 19, which are made of a CFRP, thus enabling a light weight to be achieved.

Moreover, the collision load of a side collision is transmitted from the first load-dispersing frame 25 to the outer skin 18 and the inner skin 19, but since the fitting part of the first load-dispersing frame 25 abuts against the step portion 18*b* of the outer skin 18, even if adhesion between the first load-dispersing frame 25 and the outer skin 18 comes unstuck, it is possible to reliably transmit the collision load from the first load-dispersing frame 25 to the outer skin 18 and disperse it.

In this embodiment, the step portion 18*b* is provided only on the outer skin 18, but the same operational effects can be achieved by providing a step portion only on the inner skin 19, and providing a step portion on both the outer skin 18 and the inner skin 19 is more effective.

When the first load-dispersing frame 25 is made of aluminum, which has higher ductility than that of a CFRP, since the first load-dispersing frame 25 will not be destroyed all at once due to a collision load, dispersion of the load to the front floor 12 having a sandwich structure can be carried out further effectively, but since aluminum and CFRP have different coefficients of thermal expansion, it becomes necessary to apply an adhesive or joining structure that absorbs the difference in thermal expansion to a joining part of the outer skin 18 and the inner skin 19.

Furthermore, with regard to the cores 26 and 26 of the front floor panels 12 and 12, all the axes of the corrugated sheet run along the vehicle width direction, and there is no area whose corrugated sheet axis runs along the fore-and-aft direction. If the axis of the corrugated sheet ran along the fore-and-aft direction, there is a possibility that the area would be bent due to the collision load of a side collision and the front floor panels 12 and 12 would be destroyed, but in accordance with the present embodiment, since all the axes of the corrugated sheet run along the vehicle width direction, the strength of the front floor panels 12 and 12 toward the collision load of a side collision can be enhanced.

Figure 6:
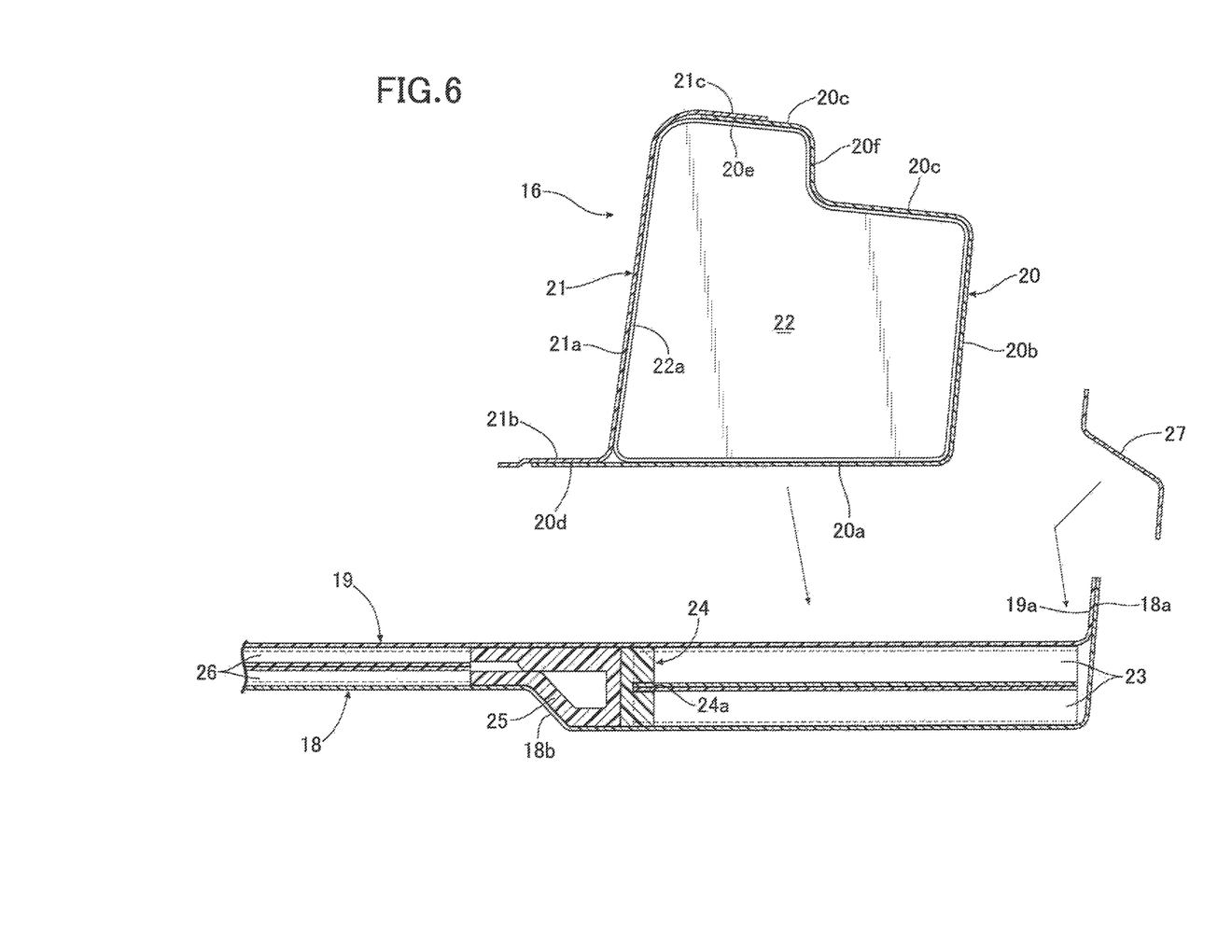
FIG. 6 is a diagram, corresponding to FIG. 4, for explaining the assembly procedure. (first embodiment)

As shown in FIG. 6, in the step of manufacturing the body floor 11, since, after the lower face of the side sill 16, which has been preassembled, is adhered to the upper face of the outer end part in the vehicle width direction of the front floor panel 12, which has been preassembled, the joining flanges 18a and 19a of the outer end part in the vehicle width direction of the front floor panel 12 and the vehicle width direction outer face 20b of the side sill 16 are linked by means of the linking member 27, the productivity of the body floor 11 is improved compared with a case in which the front floor panel 12 and the side sill 16 are assembled at the same time.

Second Embodiment

Figure 9:
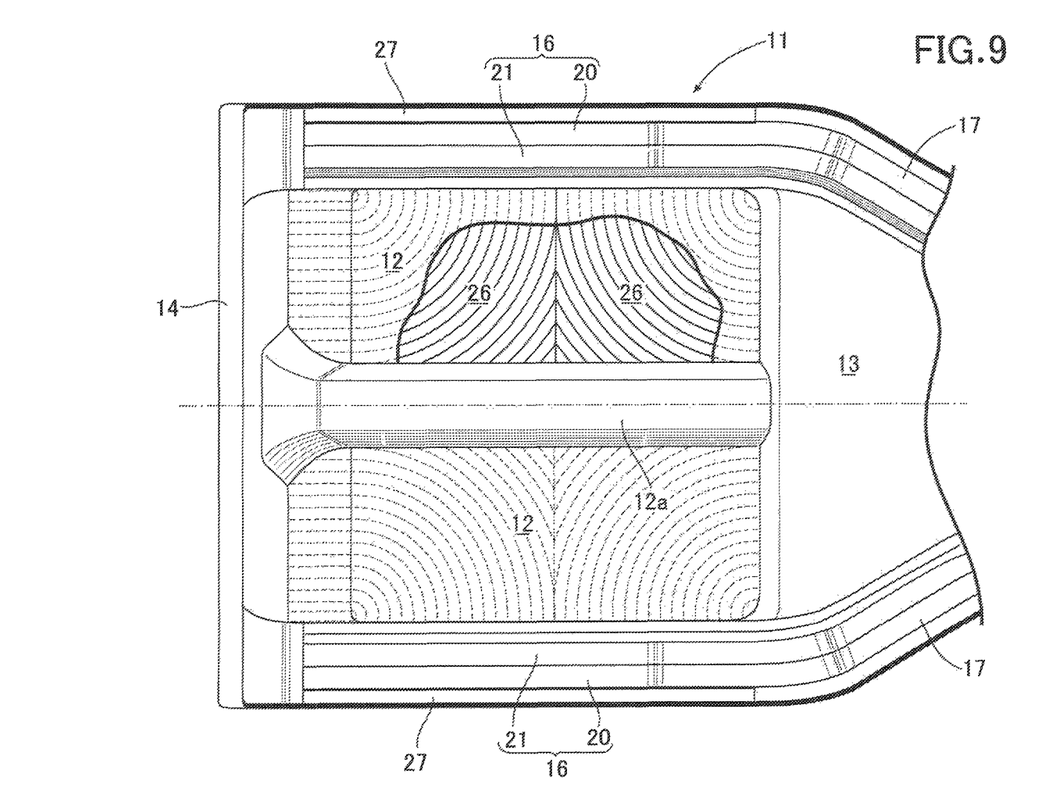
FIG. 9 is a view corresponding to FIG. 2. (second embodiment)

A second embodiment of the present invention is now explained by reference to FIG. 9.

In the first embodiment, the undulating lines of the corrugated sheet-shaped cores 26 and 26 disposed in the interior of the front floor panel 12 extend linearly in the vehicle width direction, and the collision load inputted into the side sill 16 is dispersed by transmitting it to the floor tunnel 12a or the side sill 16 on the opposite side. In the second embodiment, the undulating lines of corrugated sheet-shaped cores 26 and 26 are formed as concentric ripple shapes, and not only is a collision load inputted into a side sill 16 dispersed by transmitting it to a floor tunnel 12a or a side sill 16 on the opposite side, but it is also dispersed to a dash panel lower 14 or rear floor panel 13 side, thus enabling it to be absorbed further effectively.

Third Embodiment

Figure 10:
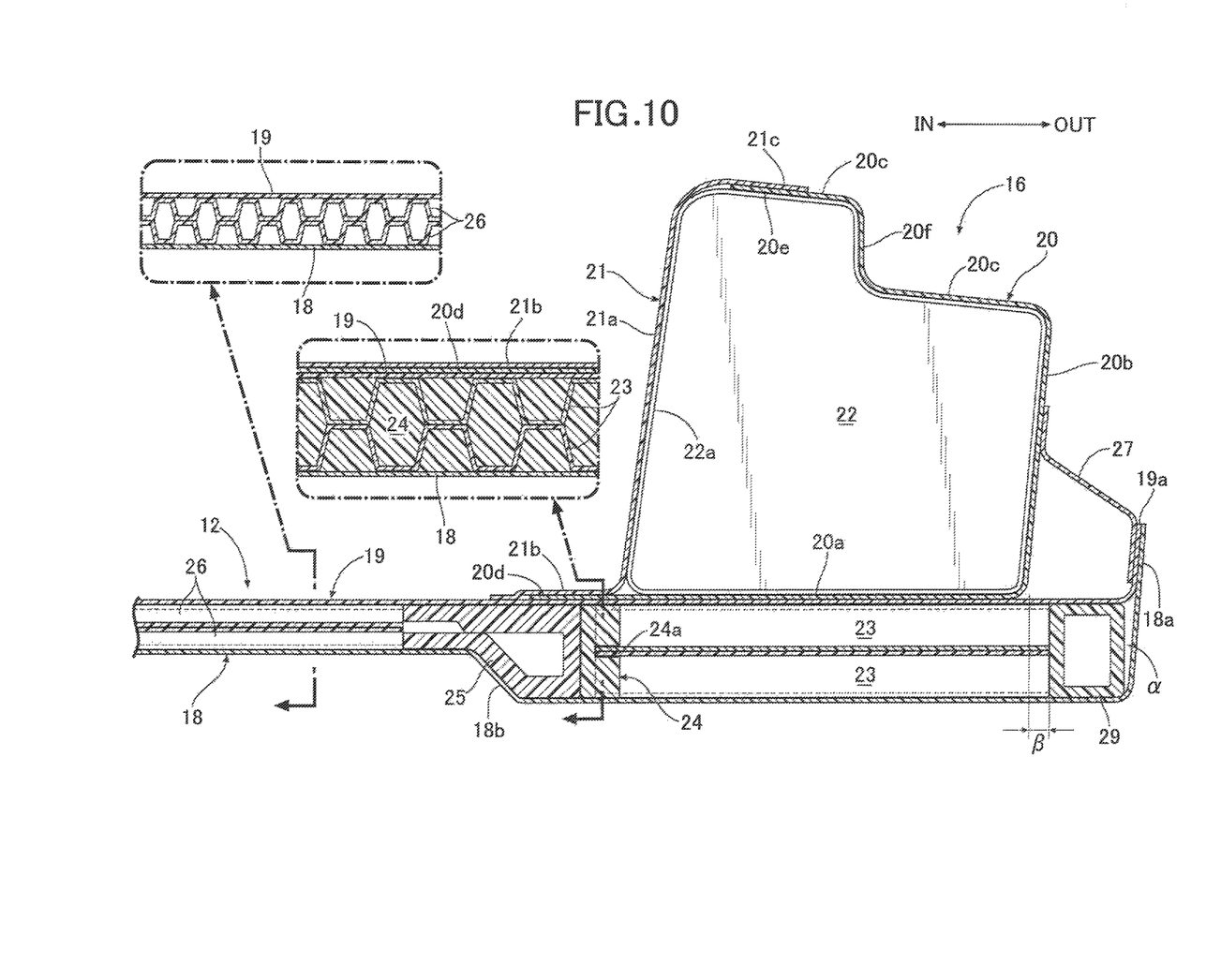
FIG. 10 is a view corresponding to FIG. 4. (third embodiment)

A third embodiment of the present invention is now explained by reference to FIG. 10.

In the first embodiment, the front floor panel 12 includes the first load-dispersing frame 25 sandwiched between the support wall 24 and the cores 26 and 26, but in the third embodiment a front floor panel 12 further includes a second load-dispersing frame 29 on the outside in the vehicle width direction of energy-absorbing members 23 and 23. The second load-dispersing frame 29, which has high stiffness and extends in the fore-and-aft direction, is made of a CFRP, as for the first load-dispersing frame 25, or made of aluminum, and is housed in part of a projecting portion of the front floor panel 12 projecting from a vehicle width direction outer wall 20b of a side sill 16.

In the first embodiment, when involved in a side collision with a narrow, long object such as a pole, there is a possibility that the energy-absorbing members 23 and 23 will be locally crumpled and it will not be possible for a sufficient energy-absorbing effect to be obtained, but in accordance with the present embodiment, since the second load-dispersing frame 29, which has high stiffness, is disposed on the outside in the vehicle width direction of the energy-absorbing members 23 and 23, even when a local collision load is inputted from an object such as a pole, the energy-absorbing members 23 and 23 can be crumpled over a wide range, thus enhancing the energy-absorbing effect.

Embodiments of the present invention are explained above, but the present invention may be modified in a variety of ways as long as the modifications do not depart from the spirit and scope thereof.

For example, instead of joining each member by adhesion, welding or mechanical joining using a rivet, a bolt, etc. may be employed.

The invention claimed is:

1. A body structure of an automobile, in which an energy-absorbing member that crumples in a vehicle width direction so as to absorb a collision load is disposed in an interior of a floor panel to which a lower face of a side sill having a closed cross-section is connected, the floor panel having a sandwich structure in which a core is sandwiched between and joined to an outer skin and an inner skin, which are made of a CFRP, wherein a first load-dispersing frame extending in a fore-and-aft direction along the side sill is disposed between the energy-absorbing member and the core, and
    an outer end part in the vehicle width direction of the energy-absorbing member projects further outside in the vehicle width direction than an outer end part in the vehicle width direction of the side sill.

2. The body structure of an automobile according to claim 1, wherein the outer skin and the inner skin are formed by layering carbon continuous fiber layers in which carbon continuous fibers are oriented in directions of at least 0°, +60°, and −60° when the fore-and-aft direction is defined as 0°.

3. The body structure of an automobile according to claim 1, wherein the floor panel and the side sill are formed from separate members, a lower face of the side sill is adhered to an upper face of the floor panel, and an outer end part in the vehicle width direction of the floor panel and an outer end part in the vehicle width direction of the side sill are linked.

4. The body structure of an automobile according to claim 1, wherein a thickness in a vertical direction of the energy-absorbing member is larger than a thickness in the vertical direction of the core with a step portion of the outer skin as a boundary, and the first load-dispersing frame between the energy-absorbing member and the core has a fitting part that fits onto the step portion (18b).

5. The body structure of an automobile according to claim 1, wherein a second load-dispersing frame extending in the fore-and-aft direction is disposed on the outside in the vehicle width direction of the energy-absorbing member.

6. The body structure of an automobile according to claim 1, wherein the core is formed from a corrugated sheet made of a CFRP, and an axis of the corrugated sheet runs along the vehicle width direction.

7. The body structure of an automobile according to claim 1, wherein the energy-absorbing member is formed from a corrugated sheet in which carbon continuous fiber layers are layered.

8. The body structure of an automobile according to claim 1, wherein a space (a) is formed between an outer end part in the vehicle width direction of the floor panel and an outer end part in the vehicle width direction of the energy-absorbing member.

9. The body structure of an automobile according to claim 1, wherein the energy-absorbing member is formed from a sheet material forming a large number of hollow parts extending in the vehicle width direction, and an inner end part in the vehicle width direction of the sheet material is fitted into a fitting groove formed in an outer face in the vehicle width direction of a support wall fixed to the interior of the floor panel.

10. The body structure of an automobile according to claim 1, wherein the side sill has an L-shaped cross section in which a height of an outer portion in the vehicle width direction is smaller than a height of an inner portion in the vehicle width direction.

11. A method for manufacturing a body floor, the method comprising
   a step of manufacturing a floor panel in which an energy-absorbing member that crumples in a vehicle width direction so as to absorb a collision load is further sandwiched between outer end parts in the vehicle width direction of a sandwich structure formed by sandwiching a core between an outer skin and an inner skin made of a CFRP and joining,
   a step of manufacturing a side sill with a closed cross-section having substantially an entire periphery of a partition wall plate joined to an inner face of the side sill,
   a step of joining the side sill to an upper face of the floor panel so that an outer end part in the vehicle width direction of the energy-absorbing member projects further outside in the vehicle width direction than an outer end part in the vehicle width direction of the side sill, and
   a step of linking an outer end part in the vehicle width direction of the floor panel and the outer end part in the vehicle width direction of the side sill by a linking member.

* * * * *